United States Patent
Gunji

(10) Patent No.: US 8,384,336 B2
(45) Date of Patent: Feb. 26, 2013

(54) MULTIPHASE MOTOR DRIVING DEVICE

(75) Inventor: Keita Gunji, Ichinomiya (JP)

(73) Assignee: Omron Automotive Electronics Co., Ltd., Achi (JP)

(*) Notice: Subject to any disclaimer, the term of this patent is extended or adjusted under 35 U.S.C. 154(b) by 659 days.

(21) Appl. No.: 12/567,030

(22) Filed: Sep. 25, 2009

(65) Prior Publication Data

US 2010/0117574 A1   May 13, 2010

(30) Foreign Application Priority Data

Sep. 26, 2008 (JP) ................................ 2008-247751

(51) Int. Cl.
*H02P 27/04* (2006.01)
(52) U.S. Cl. ............. 318/801; 318/400.26; 318/400.27; 318/400.28
(58) Field of Classification Search .................. 318/801, 318/400.21, 400.22, 400.23, 400.32, 400.34, 318/400.26, 400.27, 400.28; 361/91.2; 388/811, 388/819
See application file for complete search history.

(56) References Cited

U.S. PATENT DOCUMENTS

| | | | | |
|---|---|---|---|---|
| 7,049,778 B2 * | 5/2006 | Katanaya | ................ | 318/400.04 |
| 2003/0006749 A1 | 1/2003 | Rollman | | |
| 2008/0067960 A1 * | 3/2008 | Maeda et al. | ............ | 318/400.02 |
| 2008/0265829 A1 * | 10/2008 | Hayashi et al. | ................ | 318/781 |

FOREIGN PATENT DOCUMENTS

| | | |
|---|---|---|
| EP | 1 359 663 | 11/2003 |
| JP | 2004-357463 A | 12/2004 |
| JP | 2005-143153 A | 6/2005 |

OTHER PUBLICATIONS

Extended European Search Report for European Application No. 09171058.2-2207, mailed on Feb. 12, 2010 (7 pages).

* cited by examiner

*Primary Examiner* — Antony M Paul
(74) *Attorney, Agent, or Firm* — Osha Liang LLP

(57) ABSTRACT

A multiphase motor driving device has an inverter circuit. The inverter circuit includes a pair of upper and lower switching elements, a shunt resistor for phase current detection, and a voltage for driving a multiphase motor. The device includes a determination unit for shifting a detection timing of the current flowing to the shunt resistor from the OFF period to the ON period of the switching element on the upper side in the phase. The determination unit determines whether or not ON failure occurs based on the current flowing to the shunt resistor of the phase in the ON period. The device has a current value estimation unit for estimating a current value of the phase in a case where the detection timing is shifted based on currents flowing to the shunt resistors of other phases.

6 Claims, 14 Drawing Sheets

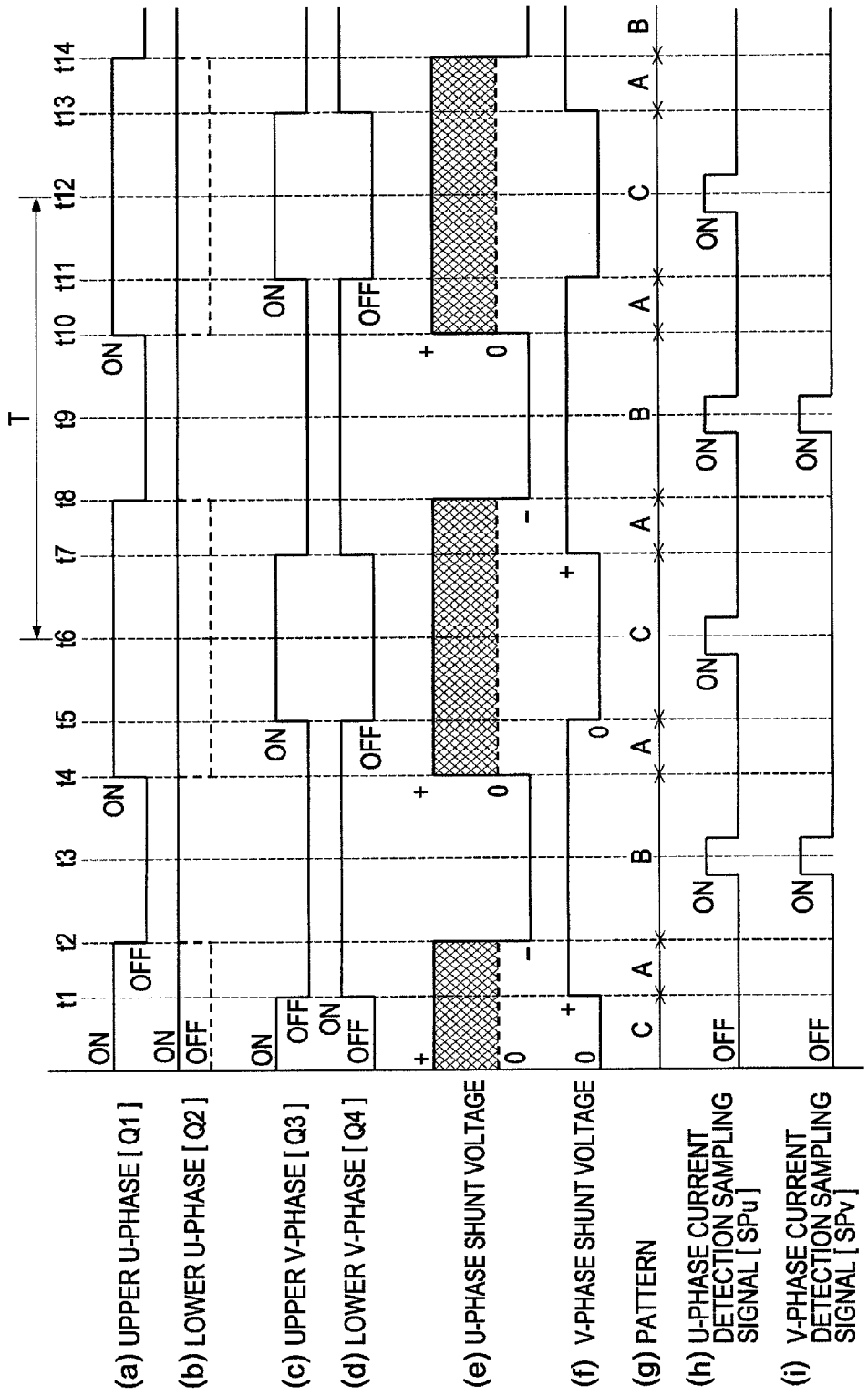

MULTIPHASE MOTOR DRIVING DEVICE

BACKGROUND OF THE INVENTION

1. Technical Field

The present invention relates to a multi-phase motor driving device used in an electrical power steering device of a vehicle, and in particular, to a technique of detecting the failure of the switching element.

2. Related Art

In the electrical power steering device of the vehicle, a multi-phase motor such as a three-phase brushless motor is arranged to provide a steering auxiliary force corresponding to the steering torque of the handle to a steering mechanism. The device for driving the multi-phase motor includes a control unit, a PWM (Pulse Width Modulation) circuit, and an inverter circuit. The control unit calculates the target value of the current to be flowed to the motor according to the steering torque detected by a torque sensor, and calculates a command value provided to the PWM circuit based on a deviation of the target value and the value of the current actually flowing to the motor. The PWM circuit generates a PWM signal having a duty ratio corresponding to the command value, and provides the same to the inverter circuit. The inverter circuit has a pair of upper and lower switching elements, which are turned ON/OFF according to the duty ratio of the PWM signal, for each phase, outputs the voltage of each phase corresponding to the duty ratio based on the ON/OFF operation of the switching elements, and drives the motor with such voltage. The current of each phase of the motor is detected by measuring the voltage at both ends of a phase current detection shunt resistor connected in series with the switching element, where such detection value becomes the value of the current actually flowing to the motor.

In the multi-phase motor driving device described above, a circuit for performing failure detection is arranged since the motor drive cannot be normally performed if failure such as short-circuit occurs. Japanese Unexamined Patent Publication No. 2004-357463 and Japanese Unexamined Patent Publication No. 2005-143153 describe such failure detection circuit. In Japanese Unexamined Patent Publication No. 2004-357463, a detection circuit for detecting an abnormality judgment voltage based on the drain voltage and the gate voltage of the FET on the lower side of each phase of the inverter circuit is arranged, where the voltage value of the voltage detected by such detection circuit and a predetermined value are compared, and the control signal output to the FET is stopped if the voltage value is greater than the predetermined value. In Japanese Unexamined Patent Publication No. 2005-143153, the abnormality of the current value flowing to each phase is detected by comparing two current values obtained by actual measurement or estimation such as the actual current value flowing to each phase of the inverter circuit and the estimated current value.

SUMMARY

In the inverter circuit including a pair of upper and lower switching elements in each phase, the switching element of a certain phase may remain in the ON state by the abnormality of the element itself, and may not return to the OFF state. The switching element may remain in the ON state and may not return to the OFF state even if the element itself is normal in a case where the control circuit for providing the control signal to the element is abnormal and continuously outputs the ON signal. The failure in which the switching element remains in the ON state is hereinafter called the "ON failure".

In the inverter circuit in which the shunt resistor for detecting the phase current of the motor is connected to the switching element on the lower side of each phase, the ON failure of the switching element on the upper side can be detected but the ON failure of the switching element on the lower side cannot be detected. This is because the current flowing to the switching element on the lower side needs to be detected in a period the switching element on the upper side is turned ON (switching element on the lower side is turned OFF) to detect the ON failure of the switching element on the lower side. However, in the case of the inverter circuit in which the shunt resistor is connected to the switching element on the lower side, sampling is performed in a period the switching element on the upper side is turned OFF (switching element on the lower side is turned ON), and the voltage at both ends of the shunt resistor is sampled and held to detect the phase current of the motor. Thus, in the period the switching element on the upper side is turned ON, the sampling is not performed and the current flowing to the switching element on the lower side is not detected.

One or more embodiments of the present invention provide a multi-phase motor driving device capable of detecting the ON failure of the switching element on the lower side in the inverter circuit. Other aspects and advantages of the invention will be apparent from the following description and the appended claims.

BRIEF DESCRIPTION OF THE DRAWINGS

FIGS. 14A to 14I are timing charts for describing the method of detecting ON failure according to another embodiment of the present invention.

DETAILED DESCRIPTION

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
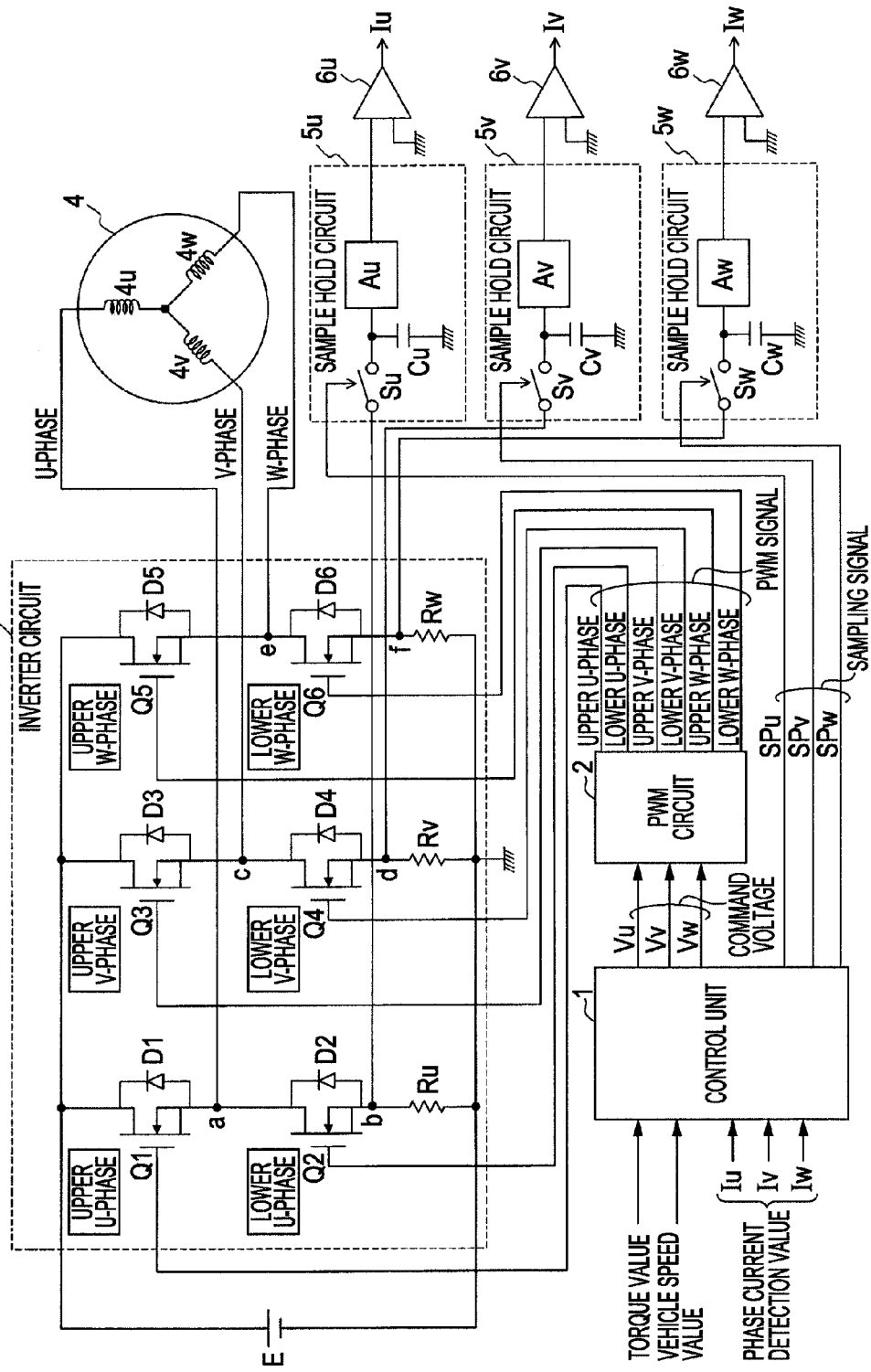
FIG. 1 is a view showing an electrical configuration of a multi-phase motor driving device according to an embodiment of the present invention.

FIG. 1 is a view showing an electrical configuration of a multi-phase motor driving device according to an embodiment of the present invention. A control unit 1 is configured by a CPU and a memory, a known PWM circuit 2 outputs the PWM signal having a predetermined duty ratio based on a voltage command signal from the control unit 1, an inverter circuit 3 outputs a three-phase voltage (U-phase voltage, V-phase voltage, W-phase voltage) for motor drive based on the PWM signal from the PWM circuit 2, a motor 4 is driven by the three-phase voltage output from the inverter circuit 3, 4u, 4v, 4w being windings of the motor 4, sample hold circuits 5u, 5v, 5w sample and sample-hold the voltage for phase current detection over a predetermined interval, and direct current (DC) amplification circuits 6u, 6v, 6w amplify the output of the sample hold circuits 5u, 5v, 5w. The control unit 1, the PWM circuit 2, the inverter circuit 3, the sample hold circuits 5u, 5v, 5w, and the DC amplification circuits 6u, 6v, 6w configure the multi-phase motor driving device. The control unit 1 serves as one embodiment of a determination unit, a current value estimation unit, and a current value calculation unit in the present invention, and the control unit 1 and the PWM circuit 2 serve as one embodiment of the control unit in the present invention.

The inverter circuit 3 is connected between a positive pole and a negative pole (ground) of a battery E, and converts a DC voltage of the battery E to an AC voltage. The inverter circuit 3 is a known circuit, and includes a pair of upper and lower switching elements Q1 to Q6 arranged in correspondence to the U-phase, the V-phase, and the W-phase, where reflux diodes D1 to D6 are connected in parallel to the switching elements Q1 to Q6. The switching elements Q1 to Q6 are configured by a MOSFET (Electric field transistor), but elements such as IGBT (Insulated Gate Bipolar Transistor) may be used. Six types (upper U-phase, lower U-phase, upper V-phase, lower V-phase, upper W-phase, lower W-phase) of PWM signals are individually provided from the PWM circuit 2 to the gate of each switching element Q1 to Q6. The switching elements Q1 to Q6 are turned ON (conductive state) in the interval in which the PWM signal is ON (High), and the switching elements Q1 to Q6 are turned OFF (shielded state) in the interval in which the PWM signal is OFF (Low).

The U-phase voltage, the V-phase voltage, and the W-phase voltage for the multi-phase motor drive are retrieved from the nodes a, c, and e of the pair of switching elements in each phase by the ON/OFF operation of the switching elements Q1 to Q6, and supplied to the motor 4. In other words, the U-phase voltage is retrieved from the node a of the switching elements Q1, Q2 and supplied to the U-phase winding 4u of the motor 4. The V-phase voltage is retrieved from the node c of the switching elements Q3, Q4 and supplied to the V-phase winding 4v of the motor 4. The W-phase voltage is retrieved from the node e of the switching elements Q5, Q6 and supplied to the W-phase winding 4w of the motor 4. The motor 4 is a three-phase brushless motor.

The shunt resistors Ru, Rv, Rw for detecting the phase current of the motor 4 are connected to the switching elements Q2, Q4, Q6 on the lower side of each phase in the inverter circuit 3, respectively. The voltage (potential at point b) generated at both ends of the shunt resistor Ru is input to the sample hold circuit 5u. The voltage (potential at point d) generated at both ends of the shunt resistor Rv is input to the sample hold circuit 5v. The voltage (potential at point f) generated at both ends of the shunt resistor Rw is input to the sample hold circuit 5w.

The sample hold circuits 5u, 5v, 5w include switches Su, Sv, Sw, capacitors Cu, Cv, Cw, and differential amplifiers Au, Av, Aw, respectively. When the switches Su, Sv, Sw are turned ON at a predetermined timing by the sampling signals SPu, SPv, SPw from the control unit 1, the voltages at both ends of the shunt resistors Ru, Rv, Rw are retrieved to the sample hold circuits 5u, 5v, 5w, and charged to the capacitors Cu, Cv, Cw. Thereafter, when the switches Su, Sv, Sw are turned OFF, the voltages charged in the capacitors Cu, Cv, Cw are held. The sample held voltages are amplified in the DC amplifier circuits 6u, 6v, 6w, and output as a phase current detection signals Iu, Iv, Iw. The phase current detection signals Iu, Iv, Iw represent the values of the actual current flowing to each phase of the motor 4, and are provided to the control unit 1 as a phase current detection value.

In the control unit 1, the current to be flowed to each phase of the motor 4, that is, the target value of the motor current for obtaining the necessary steering auxiliary force is calculated based on the torque value detected by a torque sensor (not shown) and the vehicle speed value detected by a vehicle speed sensor (not shown), and the target value and the phase current detection values Iu, Iv, Iw are compared to obtain the deviation. The command voltages Vu, Vv, Vw of each phase supplied to the PWM circuit 2 are calculated based on the obtained deviation. The command voltage is a parameter for performing feedback control so that the current of the target value flows to each phase windings 4u, 4v, 4w of the motor 4. The PWM circuit 2 generates six types of PWM signals having a predetermined duty ratio based on the command voltage so that the U-phase voltage, the V-phase voltage, and the W-phase voltage corresponding to the command voltages Vu, Vv, Vw are supplied to the motor 4, and provides the PWM signals to the switching elements Q1 to Q6 of the inverter circuit 3.

Figure 2:
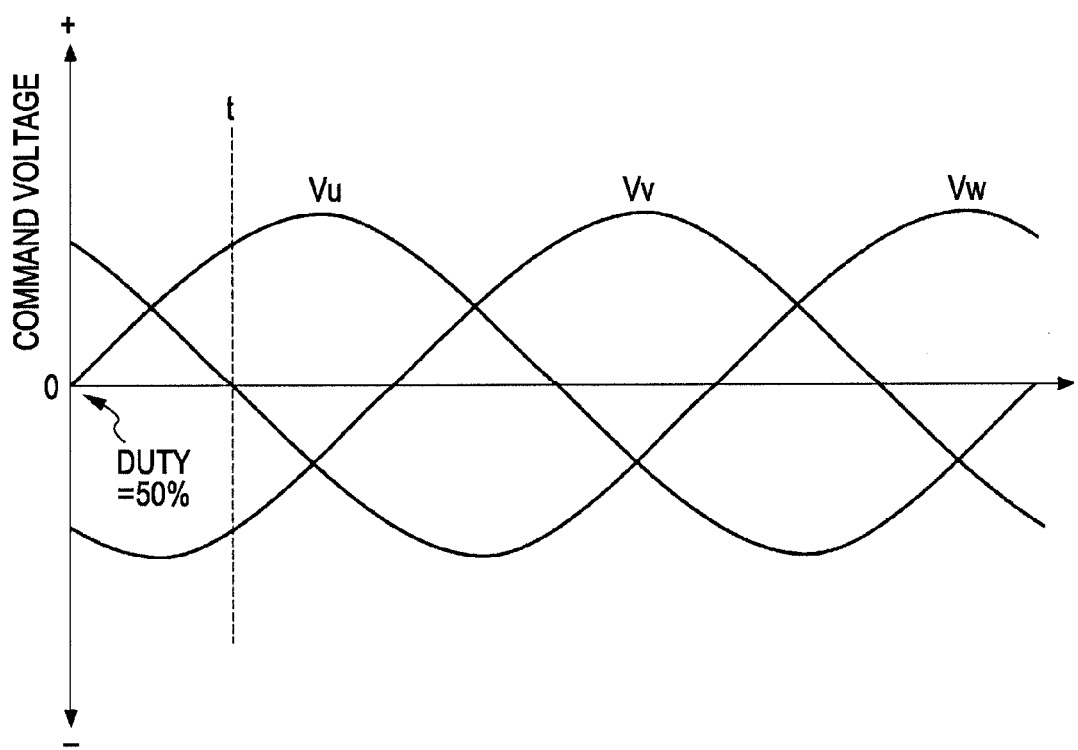
FIG. 2 is a view showing a signal waveform of the command voltages.

FIG. 2 is a view showing a signal waveform of the command voltages Vu, Vv, Vw provided from the control unit 1 to the PWM circuit 2 according to embodiments described herein. Here, the command voltage value in a case where the duty ratio of the PWM signal is 50% is zero volt. Therefore, the duty ratio of the PWM signal is greater than 50% when the command voltage value takes a positive (+) value, and the duty ratio of the PWM signal is less than 50% when the command voltage value takes a negative (−) value.

For instance, considering the U-phase command voltage Vu and the V-phase command voltage Vv at timing t of FIG. 2 (W-phase command voltage Vw is omitted to simplify the description), the U-phase command voltage Vu at timing t takes a positive (+) value, and the V-phase command voltage Vv takes a negative (−) value. Therefore, when the voltage same as each command voltage Vu, Vv is output from point a and point c of the inverter circuit 3, the current flows from the U-phase to the V-phase since the potential (U-phase voltage) of point a of FIG. 1 is positive (+) and the potential (V-phase voltage) of point c is negative (−). In this case, the duty ratio of the PWM signal provided to the switching element Q1 on the upper side of the U-phase is a value greater than 50%. For instance, if the duty ratio=70%, the ratio of the period in which the element Q1 is turned ON and the period in which the element Q1 is turned OFF is 7:3. The duty ratio of the PWM signal provided to the switching element Q3 on the upper side of the V-phase is a value less than 50%. For instance, if the duty ratio=30%, the ratio of the period in which the element Q3 is turned ON and the period in which the element Q3 is turned OFF is 3:7.

Figure 3:
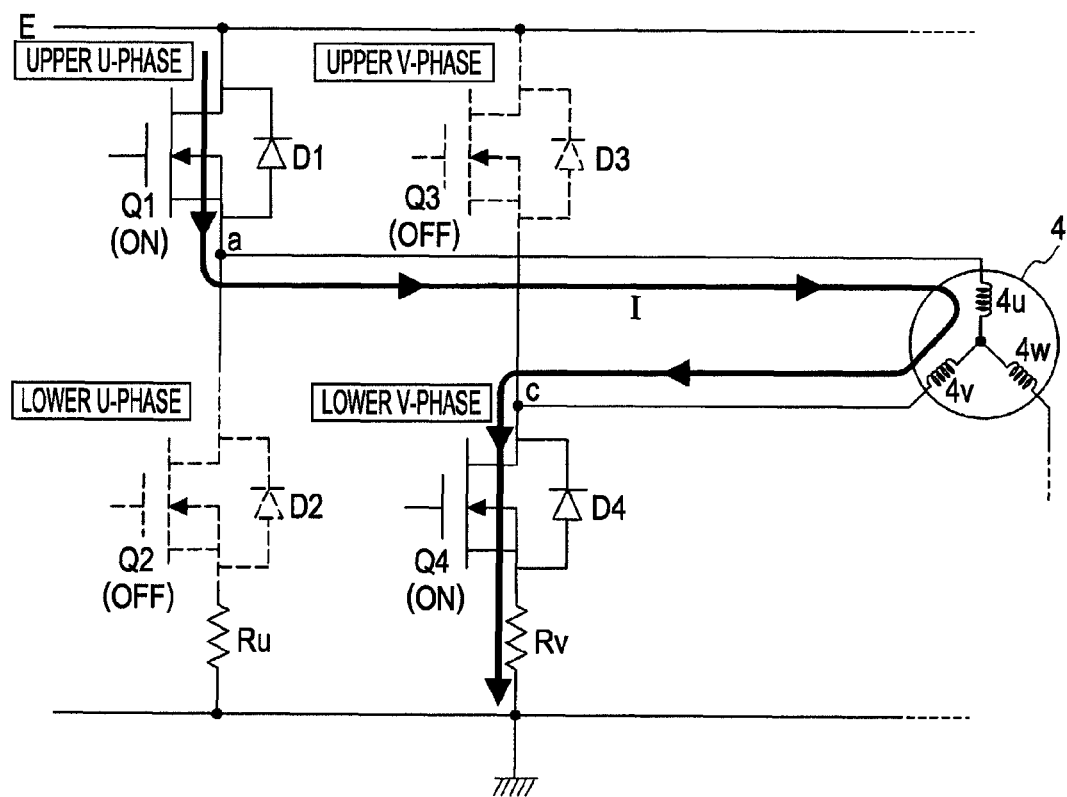
FIG. 3 is a view describing a current-carrying pattern between an inverter circuit and a motor.
Figure 4:
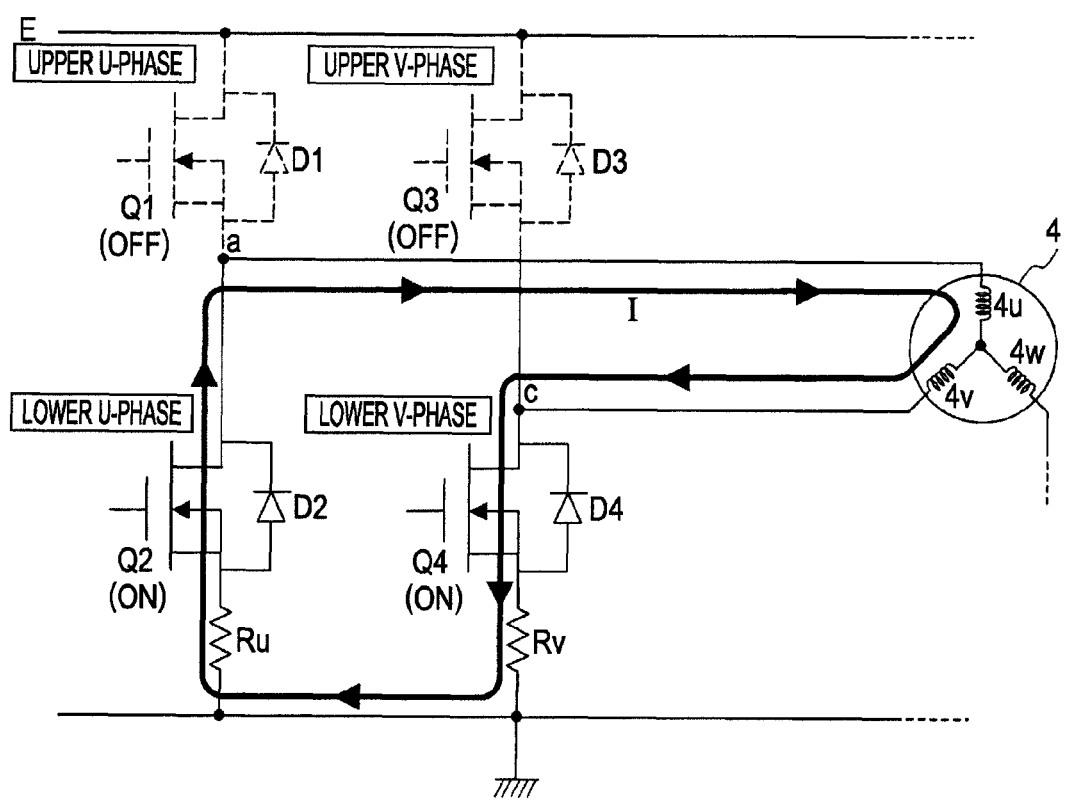
FIG. 4 is a view describing a current-carrying pattern between the inverter circuit and the motor.
Figure 5:
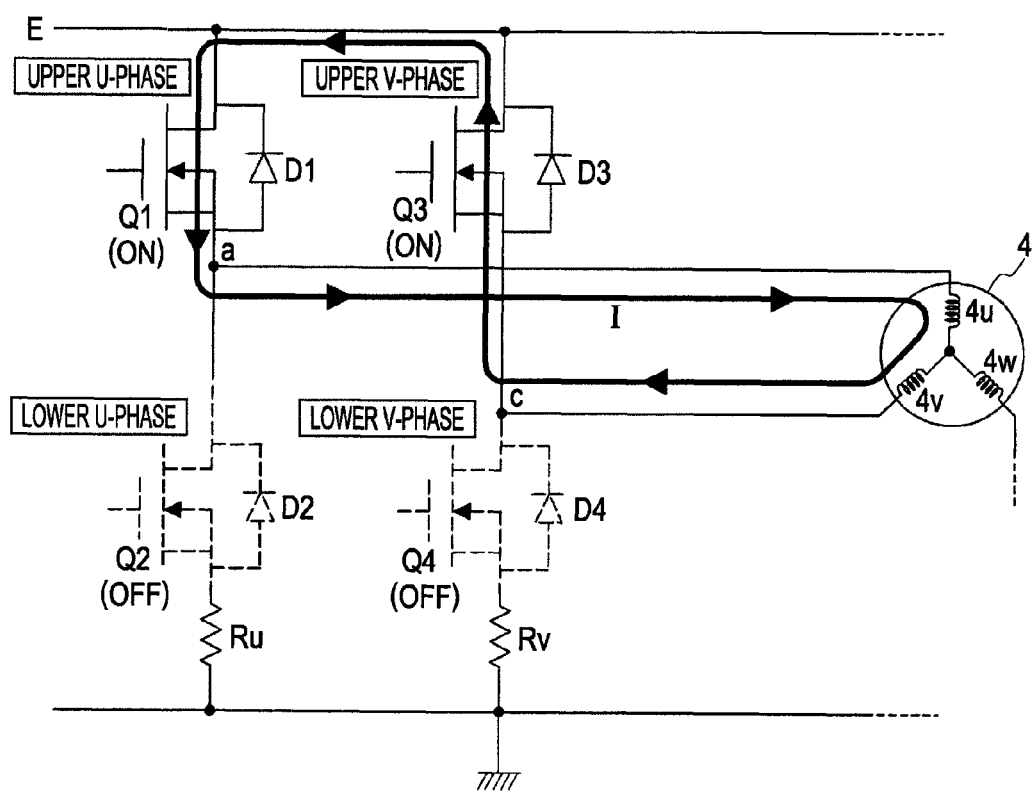
FIG. 5 is a view describing a current-carrying pattern between the inverter circuit and the motor.

The current-carrying state between the inverter circuit 3 and the motor 4 includes three patterns, as shown in FIGS. 3 to 5, according to the ON/OFF mode of the switching elements Q1 to Q6. Each figure shows a circuit extracting one part of FIG. 1, where a current path in the normal state in which failure does not exist is shown.

FIG. 3 shows pattern A, where the ON/OFF state of the switching elements Q1 to Q4 is shown with a solid line and a broken line (same in FIGS. 4 and 5) in accordance with one or more embodiments described herein. The switching elements Q1, Q4 drawn with a solid line are in the ON state, and the switching elements Q2, Q3 drawn with a broken line are in the OFF state. The pattern A is a pattern in which the switching element (Q1) on the upper side in one phase (U-phase) is turned ON, the switching element (Q2) on the lower side is turned OFF, the switching element (Q3) on the upper side in another phase (V-phase) is turned OFF, and the switching element (Q4) on the lower side is turned ON. Although the W-phase is omitted for simplification in FIG. 3, the relationship similar to the U-phase and the V-phase is satisfied for the U-phase and the W-phase, and for the V-phase and the W-phase. This is the same for other patterns to be hereinafter described. In FIG. 3, the switching element Q1 on the upper side of the U-phase is turned ON and the switching element Q4 on the lower side of the V-phase is turned ON, and thus the phase current I flows in the path of the switching element Q1→U-phase winding 4u of motor 4→V-phase winding 4v→switching element Q4→shunt resistor Rv, as shown with a heavy arrow, based on the DC voltage of the power supply E.

FIG. 4 shows pattern B in accordance with one or more embodiments described herein. The pattern B is a pattern in which the switching element (Q1) on the upper side in one phase (U-phase) is turned OFF, the switching element (Q2) on the lower side is turned ON, the switching element (Q3) on the upper side in another phase (V-phase) is turned OFF, and the switching element (Q4) on the lower side is turned ON. In FIG. 4, the switching element Q2 on the lower side of the U-phase is turned ON and the switching element Q4 on the lower side of the V-phase is turned ON, and thus the phase current I flows in the path of the U-phase winding 4u of motor 4→V-phase winding 4v→switching element Q4→shunt resistor Rv→shunt resistor Ru→switching element Q2, as shown with a heavy arrow, based on the electrical energy accumulated in the windings 4u, 4v of the motor 4.

FIG. 5 shows pattern C in accordance with one or more embodiments described herein. The pattern C is a pattern in which the switching element (Q1) on the upper side in one phase (U-phase) is turned ON, the switching element (Q2) on the lower side is turned OFF, the switching element (Q3) on the upper side in another phase (V-phase) is turned ON, and the switching element (Q4) on the lower side is turned OFF. In FIG. 5, the switching element Q1 on the lower side of the U-phase is turned ON and the switching element Q3 on the upper side of the V-phase is turned ON, and thus the phase current I flows in the path of the U-phase winding 4u→V-phase winding 4v→switching element Q3→switching element Q1, as shown with a heavy arrow, based on the electrical energy accumulated in the windings 4u, 4v of the motor 4. In the case of the pattern C, the phase current I does not flow to the shunt resistors Ru, Rv.

The detection of the phase current in the multi-phase motor driving device of FIG. 1 will now be described in accordance with one or more embodiments described herein. A case of detecting the U-phase current will be described below, by way of example, but the current of other phases can be detected according to a similar principle. The phase current flows to the shunt resistor Ru for U-phase current detection in pattern B (FIG. 4) of each pattern described in FIGS. 3 to 5. In the pattern B, the potential of point a is positive (+) and the potential of point c is negative (−), and thus the phase current I flows from the U-phase to the V-phase. In this case, the duty ratio of the PWM signal provided to the switching element Q1 on the upper side of the U-phase is greater than 50% and the duty ratio of the PWM signal provided to the switching element Q2 on the lower side of the U-phase is less than 50%, as described above.

Figure 6:
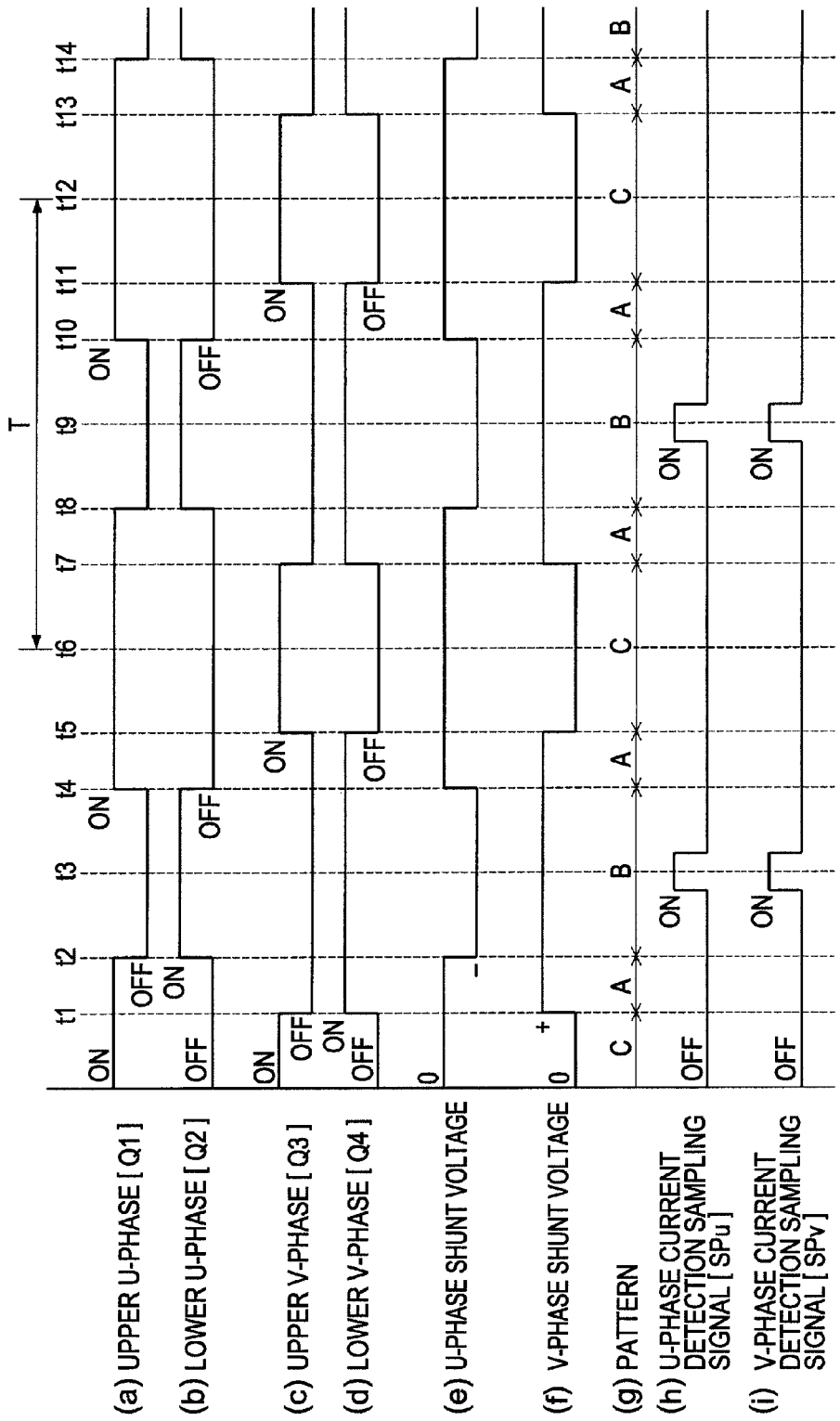
FIGS. 6A to 6I are timing charts for describing the method of detecting the U-phase current.

FIGS. 6A to 6I are timing charts for describing the method of detecting the U-phase current, showing the waveform of each signal at timing t (specifically, microscopic zone near t) of FIG. 2. FIGS. 6A to 6D show the PWM signal provided from the PWM circuit 2 to each switching element Q1 to Q4 of the upper U-phase, the lower U-phase, the upper V-phase, and the lower V-phase. Furthermore, FIG. 6E shows the voltage produced at both ends of the resistor Ru by the current flowing to the shunt resistor Ru. FIG. 6F shows the voltage produced at both ends of the resistor Rv by the current flowing to the shunt resistor Rv. FIG. 6G shows the patterns of FIGS. 3 to 5 corresponding to each interval. FIG. 6H shows the sampling signal SPu output from the control unit 1 to detect the U-phase current. FIG. 6I shows the sampling signal SPv output from the control unit 1 to detect the V-phase current. T represents one cycle of the PWM signal, and t1 to t14 represent each timing.

When detecting the U-phase current, the voltage of the shunt resistor Ru is detected by the sampling signal SPu (t3, t9) in the period (t2 to t4, t8 to t10) in which the switching element Q1 on the upper side of the U-phase is turned OFF (switching element Q2 on the lower side of U-phase is turned ON). Therefore, according to such method, the sampling in the ON period (t4 to t8, t10 to t14) of the switching element Q1 on the lower side of the U-phase necessary for detecting the ON failure of the switching element Q2 on the lower side of the U-phase is not performed, whereby the ON failure of the switching element Q2 on the lower side of the U-phase cannot be detected.

Figure 7:
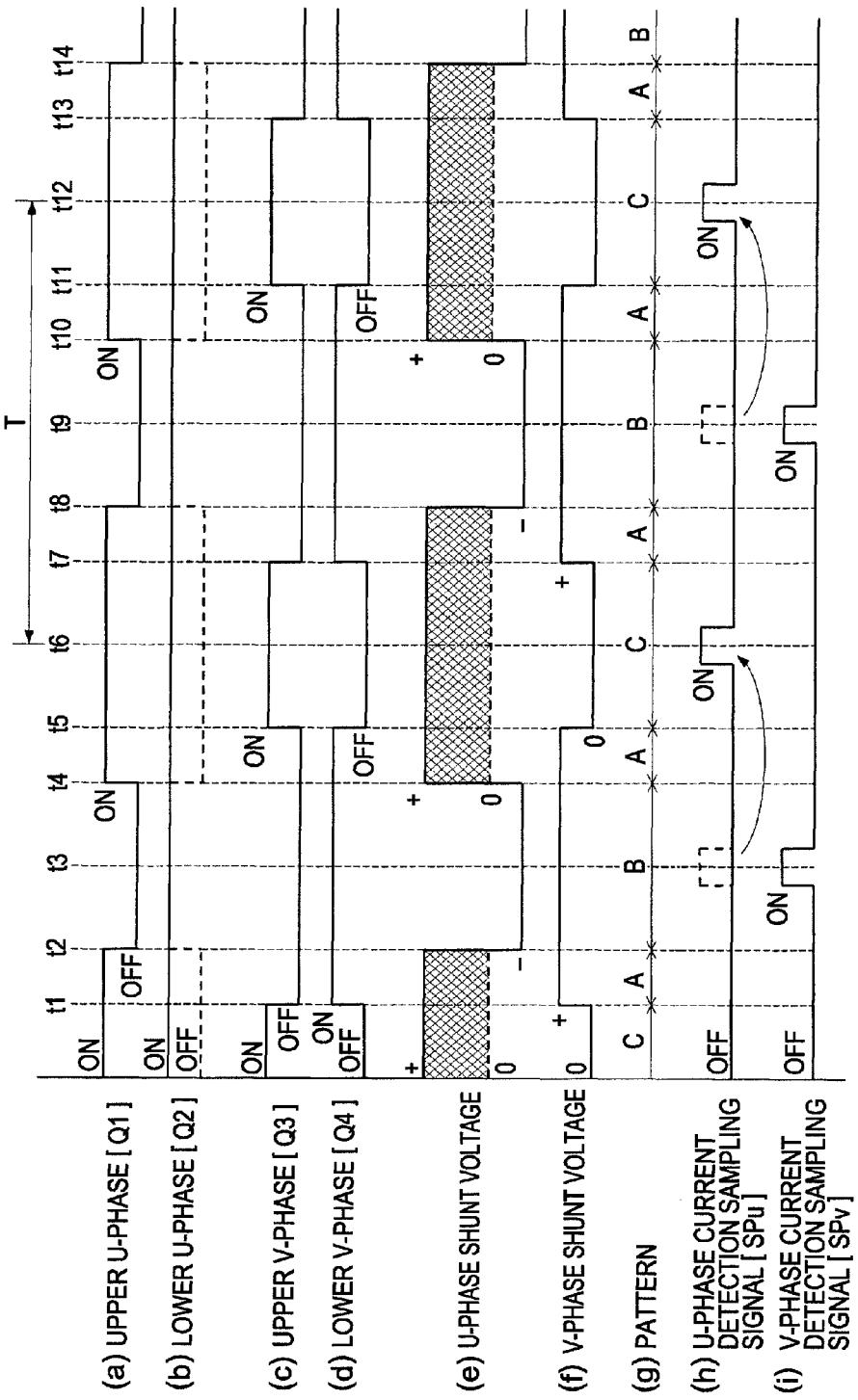
FIGS. 7A to 7I are timing charts for describing the method of detecting the ON failure in accordance with one or more embodiments of the present invention.

FIGS. 7A to 7I are timing charts for describing the method of detecting the ON failure in accordance with one or more embodiments of the present invention. Each reference symbol of FIGS. 7A to 7I corresponds to each reference symbol of FIGS. 6A to 6I. In FIGS. 7A to 7I, the U-phase current detection sampling signal SPu shown in FIG. 7H is not generated in the OFF period (t2 to t4, t8 to t10) of the switching element Q1 on the upper side of the U-phase as shown with a broken line, and is generated in the ON period (t4 to t8, t10 to t14) as shown with a solid line (t6, t12). In other words, the detection timing of the current flowing to the shunt resistor Ru of the U-phase is shifted from the OFF period to the ON period of the switching element Q1 on the upper side of the U-phase.

When the ON failure occurs in the switching element Q2 on the lower side of the U-phase, the switching element Q2 remains in the ON state, as shown in FIG. 7B, irrespective of the signal from the PWM circuit 2. In the period in which the switching element Q1 on the upper side of the U-phase is turned ON, both the upper and lower switching elements Q1, Q2 are turned ON and an abnormal current (large current) flows to the shunt resistor Ru through both elements, whereby a large voltage is generated at both ends of the shunt resistor Ru, as shown with cross hatching of FIG. 7E. The sampling is performed at the timing t6, t12 in the ON period of the switching element Q1 on the upper side of the U-phase, as shown in FIG. 7H, to detect the large voltage, whereby determination is made that the ON failure occurred in the switching element Q2 on the lower side of the U-phase.

When the ON failure has not occurred in the switching element Q2 on the lower side of the U-phase, the switching element Q2 is in the OFF state and the current does not flow in the ON period of the switching element Q1 on the upper side of the U-phase, and thus the voltage of the shunt resistor Ru is not detected even if the sampling is performed at the timing t6, t12. Thus, determination is made that the ON failure has not occurred in the switching element Q2 on the lower side of the U-phase.

The processes described above, that is, the process of shifting the detection timing of the current flowing to the shunt resistor from the OFF period to the ON period of the switching element on the upper side and performing sampling is carried out in order for each phase, so that the presence of ON failure of the switching element on the lower side in each phase can be determined using the existing shunt resistor without adding a special circuit for ON failure determination.

Figure 8:
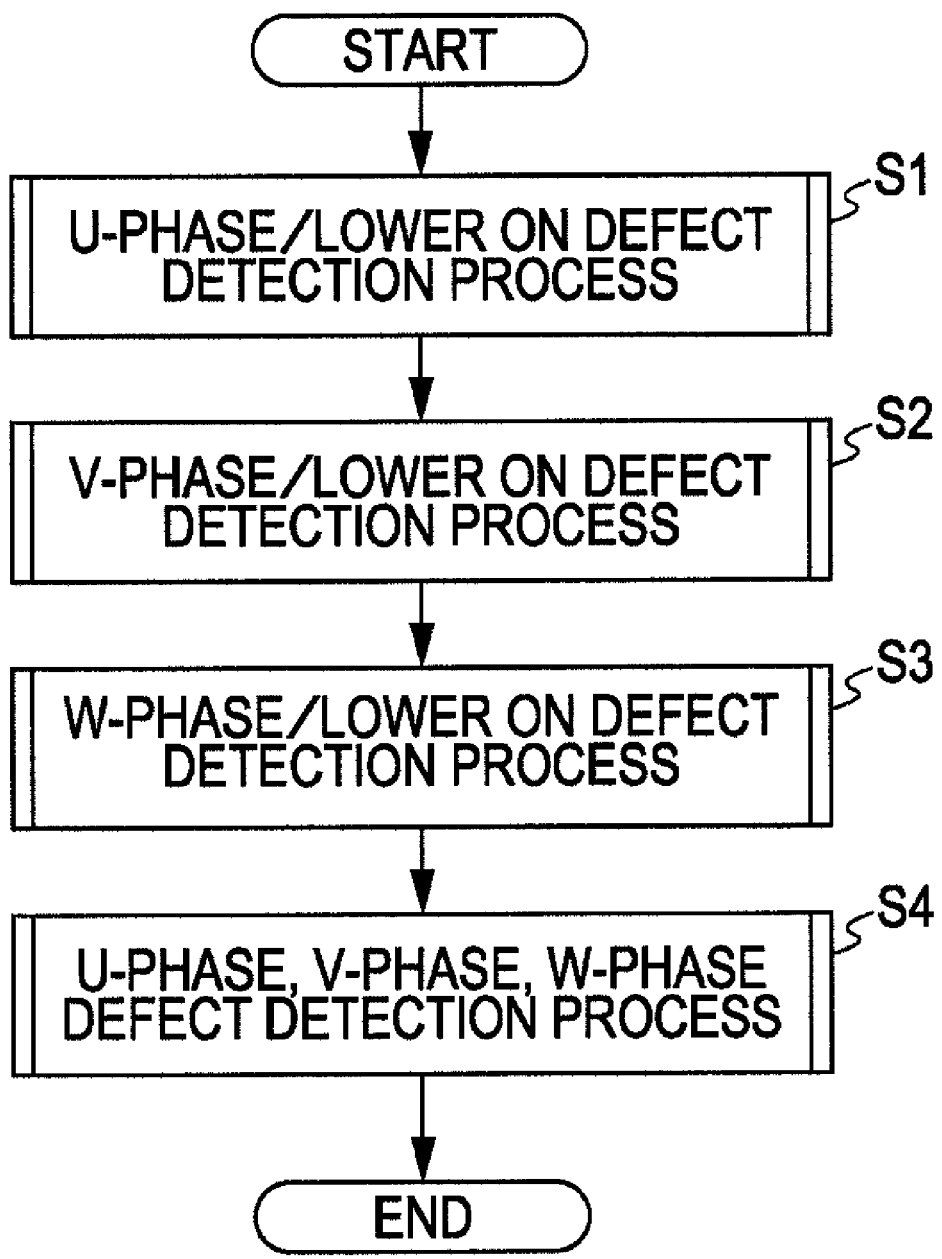
FIG. 8 is a flowchart showing an outline of a failure determination procedure in accordance with one or more embodiments of the present invention.

FIG. 8 is a flowchart showing the outline of the failure determination procedure according to one or more embodiments of the present invention, and FIGS. 9 to 12 are flowcharts showing the details of each step. The procedure of each flowchart is executed by the CPU arranged in the control unit 1.

In FIG. 8, a process of shifting the detection timing of the current flowing to the shunt resistor Ru of the U-phase and detecting the ON failure of the switching element Q2 on the lower side of the U-phase is performed in step S1. The process then proceeds to step S2, and a process of shifting the detection timing of the current flowing the shunt resistor Rv of the V-phase and detecting the ON failure of the switching element Q4 on the lower side of the V-phase is performed. Thereafter, the process proceeds to step S3, and a process of shifting the detection timing of the current flowing the shunt resistor Rw of the W-phase and detecting the ON failure of the switching element Q6 on the lower side of the W-phase is performed.

After the detection of the ON failure based on the shift (FIG. 7) of the detection timing is finished for all the phases, the process proceeds to step S4, where a process of detecting the phase current flowing to the shunt resistors Ru, Rv, Rw of each phase in the OFF period of the switching elements Q1, Q3, Q5 on the upper side with respect to each of the U-phase, the V-phase, and the W-phase without shifting the detection timing this time (FIG. 6), and detecting the failure of each phase and the failure of the phase current detection circuit based on such phase current is performed.

Figure 9:
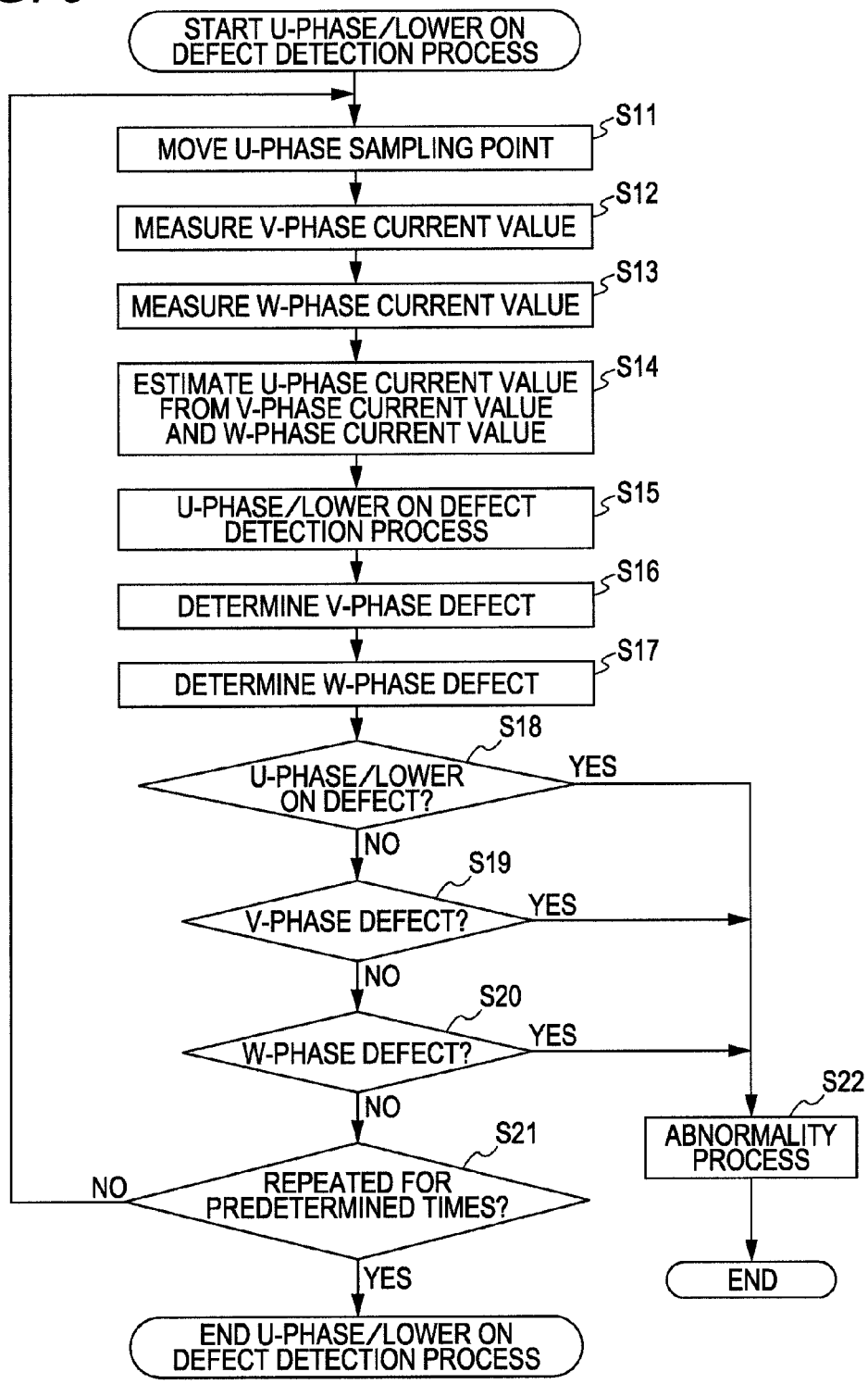
FIG. 9 is a flowchart showing a detailed procedure of step S1 of FIG. 8.

FIG. 9 is a flowchart showing the detailed procedure of step S1 of FIG. 8 in accordance with one or more embodiments described herein. In step S11, the process of moving the sampling point of the U-phase is performed. In other words, the detection timing of the current (U-phase current) flowing to the shunt resistor Ru of the U-phase is shifted from the OFF period to the ON period of the switching element Q1 on the upper side of the U-phase (FIG. 7H). The process then proceeds to step S12, and the current value of the current (V-phase current) flowing to the shunt resistor Rv of the V-phase is measured. The current detection in this case is performed in the OFF period of the switching element Q3 on the upper side of the V-phase. In other words, the detection timing of the V-phase current is not shifted (FIG. 7I). The process then proceeds to step S13, and the current value of the current (W-phase current) flowing to the shunt resistor Rw of the W-phase is measured. The current detection in this case is performed in the OFF period of the switching element Q5 on the upper side of the W-phase. In other words, the detection timing of the W-phase current is also not shifted.

The process then proceeds to step S14, and the current value of the U-phase current is estimated from the current values of the V-phase current and the W-phase current obtained in steps S12 and S13. As well known in the art, since Iu+Iv+Iw=0, where Iu is the U-phase current value, Iv is the V-phase current value, and Iw is the W-phase current value, the U-phase current value Iu can be estimated using such relationship. The U-phase current is detected in the OFF period of the switching element Q1 on the upper side of the U-phase (ON period of the switching element Q2 on the lower side of U-phase) in normal circumstances, but this may not be possible as the sampling point of the U-phase is moved, and thus the current value of the U-phase current necessary for the control of the motor 4 is obtained by estimating the current value in the above manner.

In step S15, the presence of the ON failure of the switching element Q2 on the lower side of the U-phase is determined based on the voltage at both ends of the shunt resistor Ru detected at the sampling point moved in step S11. As described above, the presence of the ON failure can be determined since a large voltage is generated at both ends of the shunt resistor Ru if the ON failure has occurred in the switching element Q2, and the voltage is not generated at both ends of the shunt resistor Ru if the ON failure has not occurred.

In step S16, whether or not a failure has occurred in the V-phase is determined based on the V-phase current value obtained in step S12. In step S17, whether or not a failure has occurred in the W-phase is determined based on the W-phase current value obtained in step S13. Such failure determination is performed through a method similar to the related art.

In step S18, if the ON failure has occurred in the switching element Q2 on the lower side of the U-phase (step S18: YES) as a result of the determination in step S15, the process proceeds to step S22 and an abnormality process is performed. Specifically, a process of stopping the power supply from the inverter circuit 3 to the motor 4, and stopping the motor 4 is performed. An alarm is output as necessary. If the ON failure has not occurred in the switching element Q2 (step S18: NO), the process proceeds to step S19.

In step S19, if failure has occurred in the V-phase (step S19: YES) as a result of the determination in step S16, the process proceeds to step S22 and the above-described abnormality process is performed. If the failure has not occurred in the V-phase (step S19: NO), the process proceeds to step S20.

In step S20, if failure has occurred in the V-phase (step S19: YES) as a result of the determination in step S17, the process proceeds to step S22 and the above-described abnormality process is performed. If the failure has not occurred in the V-phase (step S20: NO), the process proceeds to step S21.

In step S21, whether or not the processes of steps S11 to S20 are repeated for a predetermined number of times is determined, where if not repeated for a predetermined number of times (step S21: NO), the process returns to step S11 and steps S11 to S20 are iteratively executed until the predetermined number of time is reached. If the processes of steps S11 to S20 are repeated for a predetermined number of times (step S21: YES), the ON failure detection process with respect to the U-phase is terminated. In this case, the sampling point shifted to the ON period of the switching element Q11 in step S11 is returned to the original position (OFF period of switching element Q1).

Figure 10:
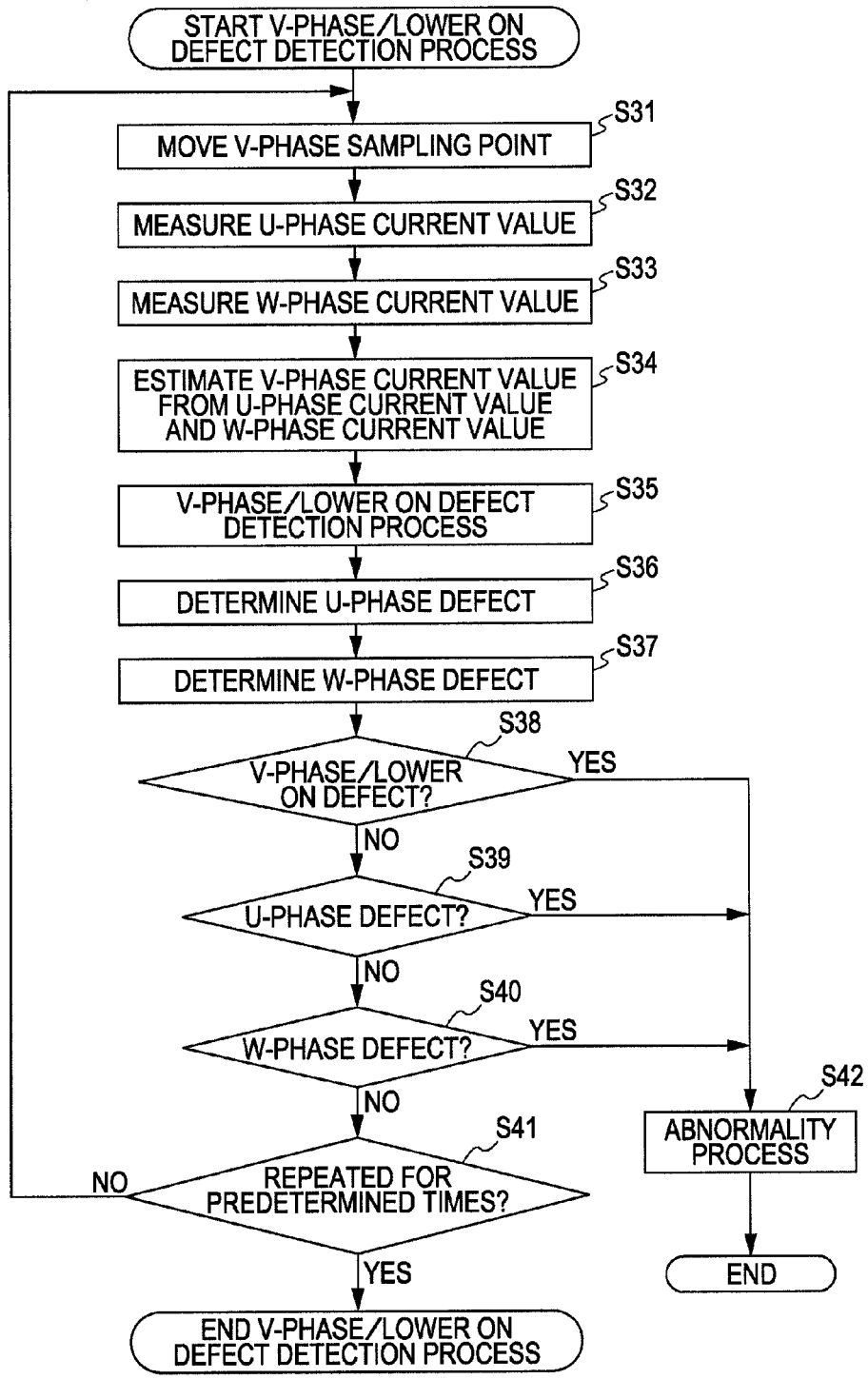
FIG. 10 is a flowchart showing a detailed procedure of step S2 of FIG. 8.

FIG. 10 is a flowchart showing the detailed procedure of step S2 of FIG. 8 in accordance with one or more embodiments described herein. In step S31, the process of moving the sampling point of the V-phase is performed. In other words, the detection timing of the current (V-phase current) flowing to the shunt resistor Rv of the V-phase is shifted from the OFF period to the ON period of the switching element Q3 on the upper side of the U-phase. The process then proceeds to step S32, and the current value of the current (U-phase current) flowing to the shunt resistor Ru of the U-phase is measured. The current detection in this case is performed in the OFF period of the switching element Q1 on the upper side of the U-phase. In other words, the detection timing of the U-phase current is not shifted. The process then proceeds to step S33, and the current value of the current (W-phase current) flowing to the shunt resistor Rw of the W-phase is measured. The current detection in this case is performed in the OFF period of the switching element Q5 on the upper side of the W-phase. In other words, the detection timing of the W-phase current is also not shifted.

Thereafter, the process proceeds to step S34, and the current value of the V-phase current is estimated using the relationship Iu+Iv+Iw=0 from the current values of the U-phase current and the W-phase current obtained in steps S32 and S33. The V-phase current is detected in the OFF period of the switching element Q3 on the upper side of the V-phase (ON period of the switching element Q4 on the lower side of V-phase) in normal circumstances, but this may not be possible as the sampling point of the V-phase is moved, and thus the current value of the V-phase current necessary for the control of the motor 4 is obtained by estimating the current value in the above manner.

In step S35, the presence of the ON failure of the switching element Q4 on the lower side of the V-phase is determined based on the voltage at both ends of the shunt resistor Rv detected at the sampling point moved in step S31. Similar to the case of U-phase, the presence of the ON failure can be determined since a large voltage is generated at both ends of the shunt resistor Rv if the ON failure has occurred in the switching element Q4, and the voltage is not generated at both ends of the shunt resistor Rv if the ON failure has not occurred.

In step S36, whether or not a failure has occurred in the U-phase is determined based on the U-phase current value obtained in step S32. In step S37, whether or not a failure has occurred in the W-phase is determined based on the W-phase current value obtained in step S33. Such failure determination is performed through a method similar to the related art.

In step S38, if the ON failure has occurred in the switching element Q4 on the lower side of the V-phase (step S38: YES) as a result of the determination in step S35, the process proceeds to step S42 and an abnormality process similar to step S22 is performed. If the ON failure has not occurred in the switching element Q4 (step S38: NO), the process proceeds to step S39.

In step S39, if failure has occurred in the U-phase (step S39: YES) as a result of the determination in step S36, the process proceeds to step S42 and the above-described abnormality process is performed. If the failure has not occurred in the U-phase (step S39: NO), the process proceeds to step S40.

In step S40, if failure has occurred in the W-phase (step S40: YES) as a result of the determination in step S37, the process proceeds to step S42 and the above-described abnormality process is performed. If the failure has not occurred in the W-phase (step S40: NO), the process proceeds to step S41.

In step S41, whether or not the processes of steps S31 to S40 are repeated for a predetermined number of times is determined, where if not repeated for a predetermined number of times (step S41: NO), the process returns to step S31 and steps S31 to S40 are iteratively executed until the predetermined number of time is reached. If the processes of steps S31 to S40 are repeated for a predetermined number of times (step S41: YES), the ON failure detection process with respect to the V-phase is terminated. In this case, the sampling point shifted to the ON period of the switching element Q3 in step S31 is returned to the original position (OFF period of switching element Q3).

Figure 11:
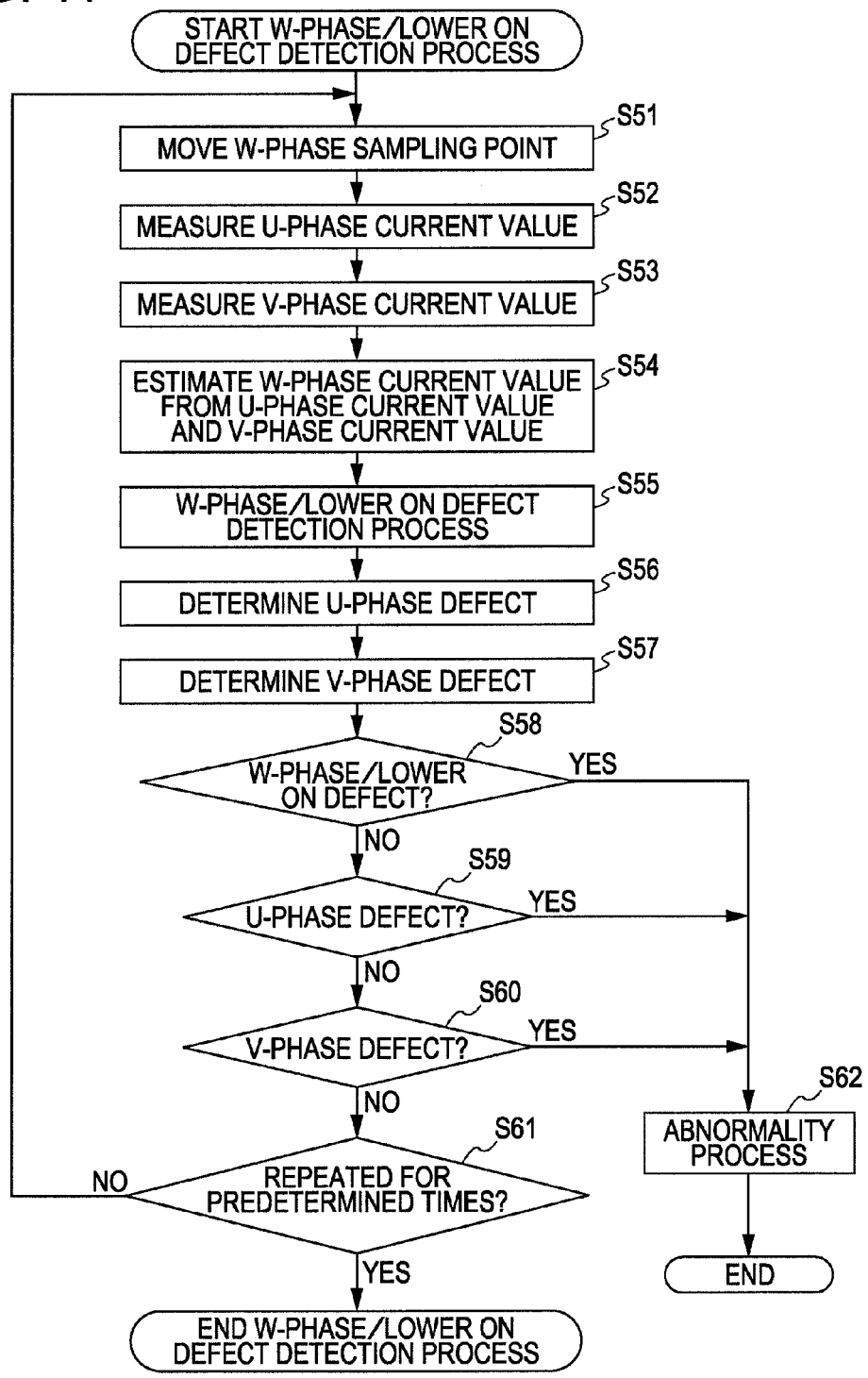
FIG. 11 is a flowchart showing a detailed procedure of step S3 of FIG. 8.

FIG. 11 is a flowchart showing the detailed procedure of step S3 of FIG. 8 in accordance with one or more embodiments described herein. In step S51, the process of moving the sampling point of the W-phase is performed. In other words, the detection timing of the current (W-phase current) flowing to the shunt resistor Rw of the W-phase is shifted from the OFF period to the ON period of the switching element Q5 on the upper side of the W-phase. The process then proceeds to step S32, and the current value of the current (U-phase current) flowing to the shunt resistor Ru of the U-phase is measured. The current detection in this case is performed in the OFF period of the switching element Q1 on the upper side of the U-phase. In other words, the detection timing of the U-phase current is not shifted. The process then proceeds to step S53, and the current value of the current (V-phase current) flowing to the shunt resistor Rv of the V-phase is measured. The current detection in this case is performed in the OFF period of the switching element Q3 on the upper side of the V-phase. In other words, the detection timing of the V-phase current is also not shifted.

Thereafter, the process proceeds to step S54, and the current value of the W-phase current is estimated using the relationship Iu+Iv+Iw=0 from the current values of the U-phase current and the V-phase current obtained in steps S52 and S53. The W-phase current is detected in the OFF period of the switching element Q5 on the upper side of the W-phase (ON period of the switching element Q6 on the lower side of W-phase) in normal circumstances, but this may not be possible as the sampling point of the W-phase is moved, and thus the current value of the W-phase current necessary for the control of the motor 4 is obtained by estimating the current value in the above manner.

In step S55, the presence of the ON failure of the switching element Q6 on the lower side of the W-phase is determined based on the voltage at both ends of the shunt resistor Rw detected at the sampling point moved in step S51. Similar to the case of U-phase and V-phase, the presence of the ON failure can be determined since a large voltage is generated at both ends of the shunt resistor Rw if the ON failure has occurred in the switching element Q6, and the voltage is not generated at both ends of the shunt resistor Rw if the ON failure has not occurred.

In step S56, whether or not a failure has occurred in the U-phase is determined based on the U-phase current value obtained in step S52. In step S57, whether or not a failure has occurred in the V-phase is determined based on the V-phase current value obtained in step S53. Such failure determination is performed through a method similar to the related art.

In step S58, if the ON failure has occurred in the switching element Q6 on the lower side of the W-phase (step S58: YES) as a result of the determination in step S55, the process proceeds to step S62 and an abnormality process similar to step S22 is performed. If the ON failure has not occurred in the switching element Q6 (step S58: NO), the process proceeds to step S59.

In step S59, if failure has occurred in the U-phase (step S59: YES) as a result of the determination in step S56, the process proceeds to step S62 and the above-described abnormality process is performed. If the failure has not occurred in the U-phase (step S59: NO), the process proceeds to step S60.

In step S60, if failure has occurred in the V-phase (step S60: YES) as a result of the determination in step S57, the process proceeds to step S62 and the above-described abnormality process is performed. If the failure has not occurred in the V-phase (step S60: NO), the process proceeds to step S61.

In step S61, whether or not the processes of steps S51 to S60 are repeated for a predetermined number of times is determined, where if not repeated for a predetermined number of times (step S61: NO), the process returns to step S51 and steps S51 to S60 are iteratively executed until the predetermined number of time is reached. If the processes of steps S51 to S60 are repeated for a predetermined number of times (step S61: YES), the ON failure detection process with respect to the W-phase is terminated. In this case, the sampling point shifted to the ON period of the switching element Q5 in step S51 is returned to the original position (OFF period of switching element Q5).

Figure 12:
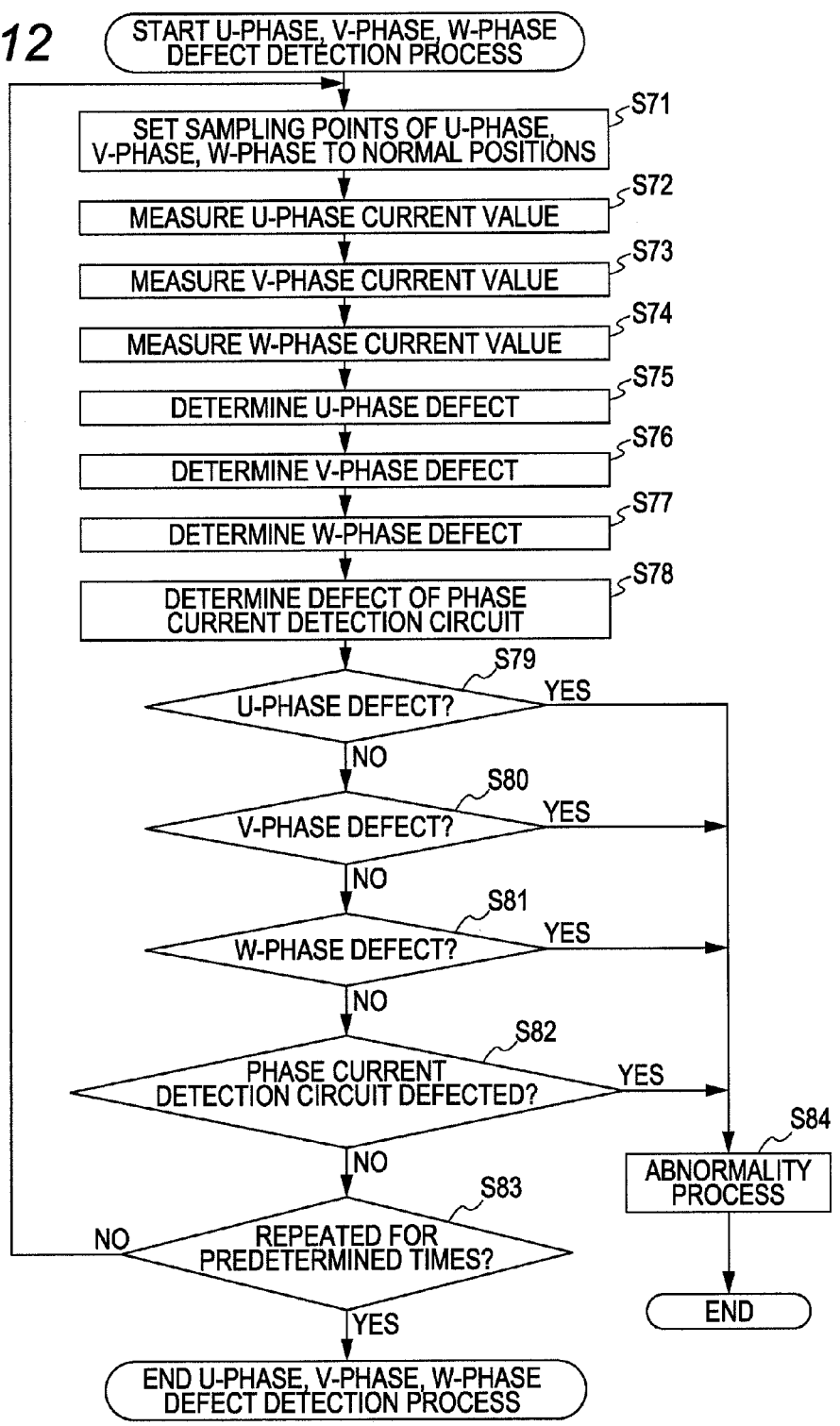
FIG. 12 is a flowchart showing a detailed procedure of step S4 of FIG. 8.

FIG. 12 is a flowchart showing a detailed procedure of step S4 of FIG. 8 in accordance with one or more embodiments described herein. In step S71, the sampling points (phase current detection timing) of the U-phase, the V-phase, and the W-phase is set to a normal position. In other words, the sampling point is set in the OFF period of the switching element Q1 on the upper side of the U-phase for the U-phase (FIG. 6H), the sampling point is set in the OFF period of the switching element Q3 on the upper side in the V-phase for the V-phase (FIG. 6I), and the sampling point is set in the OFF period of the switching element Q5 on the upper side of the W-phase for the W-phase (not shown).

In step S72, the sampling is performed at the sampling point of the U-phase set in step S71, and the current value of the U-phase current flowing to the shunt resistor Ru of the U-phase is measured. In the next step S73, the sampling is performed at the sampling point of the V-phase set in step S71, and the current value of the V-phase current flowing to the shunt resistor Rv of the V-phase is measured. In the following step S74, the sampling is performed at the sampling point of the W-phase set in step S71, and the current value of the W-phase current flowing to the shunt resistor Rw of the W-phase is measured.

In step S75, whether or not failure occurred in the U-phase is determined based on the U-phase current value obtained in step S72. In step S76, whether or not failure occurred in the V-phase is determined based on the V-phase current value obtained in step S73. Furthermore, in step S77, whether or not failure occurred in the W-phase is determined based on the W-phase current value obtained in step S74. Such failure determination is performed through a method same as the related art.

In step S78, whether or not failure has occurred in the phase current detection circuit is determined. The phase current detection circuit referred herein is the sample hold circuits $5u$, $5v$, $5w$. In the normal state, the sum of each phase current value of the U-phase, the V-phase, and the W-phase is to be zero, and thus whether or not Iu+Iv+Iw=0 is satisfied is determined using the U-phase current value Iu, the V-phase current value Iv, and the W-phase current value Iw measured in steps S72 to S74 in step S78. If such relationship is not satisfied, that is, if the sum of each phase current value is not zero, this means that the phase current detection function is abnormal and that one of (or all of) the sample hold circuits $5u$, $5v$, $5w$ is defected.

In step S79, if failure has occurred in the U-phase (step S79: YES) as a result of the determination in step S75, the process proceeds to step S84 and the abnormality process similar to step S22 is performed, whereas the process proceeds to step S80 if failure has not occurred in the U-phase (step S79: NO).

In step S80, if failure has occurred in the V-phase (step S80: YES) as a result of the determination in step S76, the process proceeds to step S84 and the abnormality process is performed, whereas the process proceeds to step S81 if failure has not occurred in the V-phase (step S80: NO).

In step S81, if failure has occurred in the W-phase (step S81: YES) as a result of the determination in step S77, the process proceeds to step S84 and the abnormality process is performed, whereas the process proceeds to step S82 if failure has not occurred in the W-phase (step S81: NO).

In step S82, if failure has occurred in the phase current detection circuit (step S82: YES) as a result of the determination in step S78, the process proceeds to step S84 and the abnormality process is performed, whereas the process proceeds to step S83 if failure has not occurred in the phase current detection circuit (step S82: NO).

In step S83, whether or not the processes of steps S71 to S82 are repeated for a predetermined number of times is determined, where if not repeated for a predetermined number of times (step S83: NO), the process returns to step S71 and steps S71 to S82 are iteratively executed until the predetermined number of time is reached. If the processes of steps S71 to S82 are repeated for a predetermined number of times (step S83: YES), the failure detection process is terminated.

Thus, in one or more of the above-described embodiments, the determination on the presence of the ON failure based on the shift of the detection timing is sequentially performed for the U-phase, the V-phase, and the W-phase (steps S1 to S3 of FIG. 8), and when the determination of the presence of the ON failure is terminated for all the phases, the phase current flowing to the shunt resistor of each phase in the OFF period of the switching element on the upper side is detected without shifting the detection timing, and the presence of failure of the U-phase, the V-phase, and the W-phase and the presence of failure of the phase current detection circuit are determined based on the detected phase current (step S4 of FIG. 8). Thus, not only the ON failure of the switching element Q2, Q4, Q6 on the lower side of each phase, but other failures such as the ON failure of the switching element Q1, Q3, Q5 on the upper side and the failure of the sample hold circuits $5u$, $5v$, $5w$ can also be determined. As a result, failure determination of higher accuracy can be performed.

Figure 13:
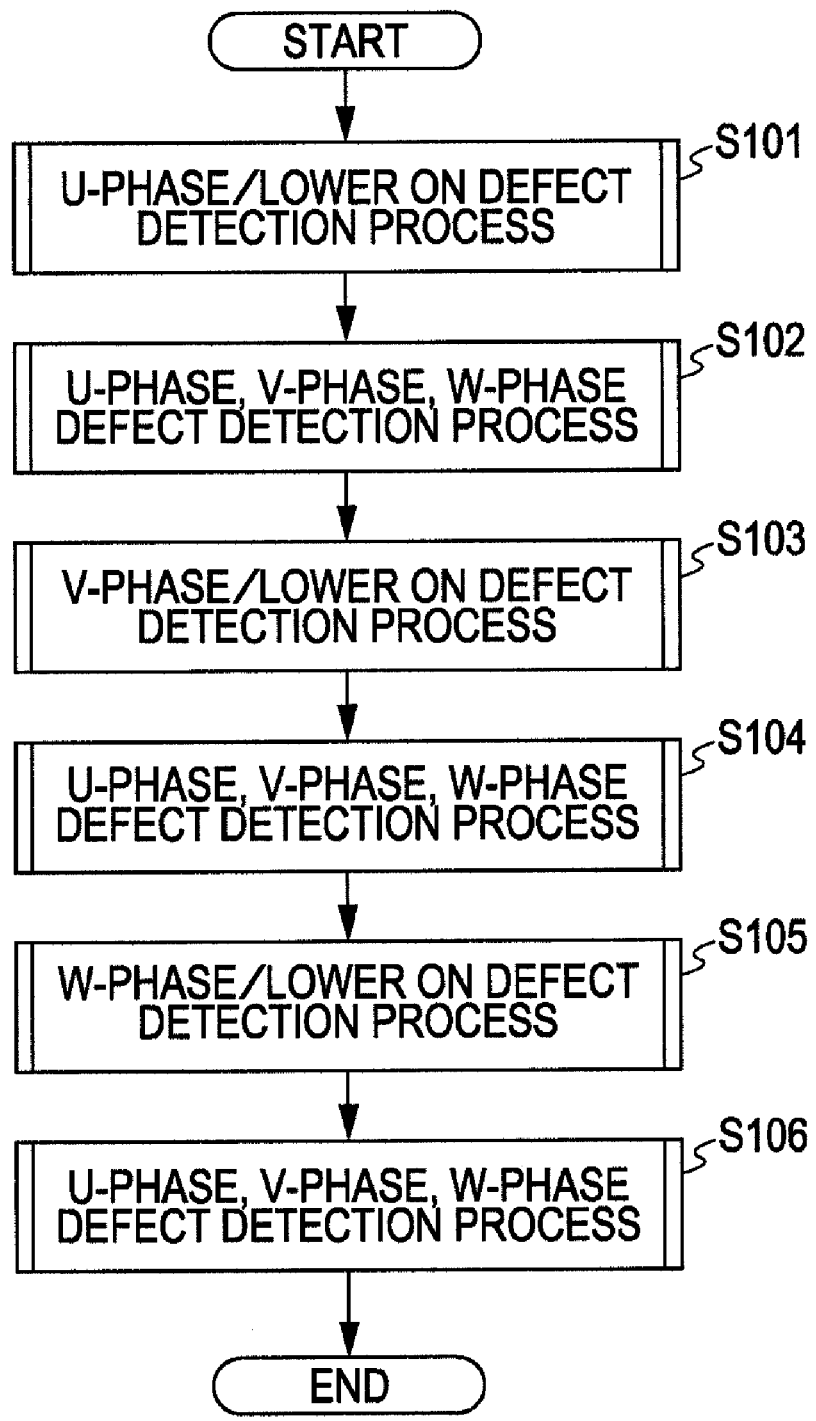
FIG. 13 is a flowchart showing an outline of a failure determination procedure according to another embodiment of the present invention.

FIG. 13 is a flowchart showing the outline of the failure determination procedure according to one or more embodiments of the present invention. The present procedure is executed by the CPU arranged in the control unit 1. In FIG. 13, a process of shifting the detection timing of the current flowing to the shunt resistor Ru of the U-phase and detecting the ON failure of the switching element Q2 on the lower side of the U-phase is performed in step S101. This process is the same as the process of step S1 of FIG. 8. The process then proceeds to step S102, and a process of detecting the phase current flowing to the shunt resistors Ru, Rv, Rw of each phase in the OFF period of the switching elements Q1, Q3, Q5 on the upper side with respect to each of the U-phase, the V-phase, and the W-phase without shifting the detection timing, and detecting the failure of each phase and the failure of the phase current detection circuit based on such phase current is performed. This process is the same as the process of step S4 of FIG. 8.

The process then proceeds to step S103, and a process of shifting the detection timing of the current flowing to the shunt resistor Rv of the V-phase and detecting the ON failure of the switching element Q4 on the lower side of the V-phase is performed. This process is the same as the process of step S2 of FIG. 8. The process then proceeds to step S104, and the process same as step S102, that is, the failure detection process based on the phase current of each phase is performed.

The process then proceeds to step S105, and a process of shifting the detection timing of the current flowing to the shunt resistor Rw of the W-phase and detecting the ON failure of the switching element Q6 on the lower side of the W-phase is performed. This process is the same as the process of step S3 of FIG. 8. The process then proceeds to step S106, and the failure detection process based on the phase current of each phase same as step S102 is performed, where the series of processes is terminated after such process is terminated.

In FIG. 13, the detailed procedures of steps S101, S103, and S105 are the same as FIGS. 9 to 11, and thus the description thereof will be omitted. The detailed procedures of steps S102, S104, and S106 are the same as FIG. 12, and thus the description thereof will be omitted.

Therefore, in the embodiment of FIG. 13, after making a determination on the presence of the ON failure based on the shift of the detection timing with respect to a certain phase and before making a similar determination on the next phase, the phase current flowing to the shunt resistor Ru, Rv, Rw of each phase in the OFF period of the switching element Q1, Q3, Q5 on the upper side is detected without shifting the detection timing and the presence of the failure of the U-phase, the V-phase, and the W-phase and the presence of the failure of the phase current detection circuit are determined based on the detected phase current. Thus, similar to the case of FIG. 8, not only the ON failure of the switching element Q2, Q4, Q6 on the lower side in each phase, but other failures can also be diagnosed, and thus failure determination of higher accuracy can be performed.

If the time constant of the sample hold circuits 5u, 5v, 5w is large (poor responsiveness), an accurate current detection value cannot be obtained as the influence of the sampling value of the previous time remains, and thus depending on the responsiveness of the sample hold circuit, it is sometimes difficult to shift the detection timing with respect to a certain phase and make a determination on the ON failure, and thereafter, immediately return the detection timing to the original timing with respect to such phase, and shift the detection timing with respect to the next phase to determine the ON failure. Thus, a step (S102, S104) of performing failure determination based on the normal phase current detection is interposed before transitioning from the determination of the ON failure of a certain phase to the determination of the ON failure of the next phase, so that a smooth failure determination can be performed even if problem arises in the responsiveness of the sample hold circuit.

FIG. 14 is a timing chart for describing the method of detecting the ON failure according to one or more embodiment of the present invention. Each reference symbol of FIG. 14 corresponds to each reference symbol of FIGS. 6 and 7.

In the previous embodiment (FIG. 7), the current value of the relevant phase in a case where the detection timing is shifted is estimated based on the currents flowing to the shunt resistors of other phases, but in the embodiment of FIG. 14, the current value of the relevant phase in a case where the detection timing is shifted is calculated based on the current flowing to the shunt resistor in the OFF period of the switching element on the upper side in the relevant phase.

For instance, referencing the U-phase, in the case of FIGS. 14A to 14I, the U-phase current detection sampling signal SPu is output and the current flowing to the shunt resistor Ru is detected in both the ON period and the OFF period of the switching element Q1 on the upper side of the U-phase (FIG. 14H). The ON failure based on abnormal current is detected at timing t6 and t12, and the original phase current is detected at timing t3 and t9. Thus, the current value of the U-phase in a case where the detection timing is shifted is obtained as an actual measurement value and not as an estimated value. This is the same for other phases.

In the present invention, various embodiments other than the above can be adopted. For instance, in the procedures of FIGS. 9 to 11, the determination on the presence of the ON failure with respect to one phase is repeated for a predetermined number of times (steps S21, S41, S61) to enhance the determination accuracy of the ON failure, but the determination on the presence of the ON failure may not be repeated and may be executed only once for one phase. Similarly, in the procedure of FIG. 12, the failure determination based on the phase current detection is repeated for a predetermined number of times (step S83), but such determination may not be repeated and may be executed only once.

In the above-described embodiment, the brushless motor has been described as the motor 4 by way of example, but the present invention can be applied to a multi-phase motor driving device, in general, for driving the motor having a plurality of phases such as an induction motor and a synchronous motor.

In the above-described embodiment, an example in which the present invention is applied to an electrical power steering device of the vehicle has been described, but the present invention may be applied to other devices.

In accordance with one aspect of the present invention, a multiphase motor driving device includes: an inverter circuit in which a pair of upper and lower switching elements is arranged in correspondence to each of a plurality of phases, a shunt resistor for phase current detection is connected to each switching element on a lower side of each phase, and a voltage for driving a multiphase motor is retrieved from a node of the pair of switching elements in each phase; and a control unit for controlling ON/OFF operation of each switching element of the inverter circuit, the multiphase motor driving device detecting a current flowing to the shunt resistor during an OFF period of the switching element on the upper side; the multiphase motor driving device further including: a determination unit for shifting a detection timing of the current flowing to the shunt resistor of a certain phase from the OFF period to the ON period of the switching element on the upper side in the phase and determining whether or not ON failure in which the switching element on the lower side in the phase remains in the ON state occurred based on the current flowing to the shunt resistor of the phase in the ON period; and a current value estimation unit for estimating a current value of the phase in a case where the detection timing is shifted based on currents flowing to the shunt resistors of other phases.

The detection timing of the current flowing to the shunt resistor is shifted to a period in which the switching element on the upper side is turned ON, so that the current flowing to the relevant element can be detected in a period in which the switching element on the lower side is turned OFF. When the ON failure occurs in the switching element on the lower side in the relevant period, the switching elements on the upper side and the lower side are both turned ON and an abnormal current flows to the shunt resistor, and thus determination is made that the ON failure occurred in the switching element on the lower side by detecting such abnormal current. If the detection timing is simply shifted, the phase current necessary under normal circumstances in the OFF period of the switching element on the upper side (ON period of the switching element on the lower side) cannot be detected, but such problem is solved in the present invention by estimating the current value of the relevant phase in a case where the detection timing is shifted based on the currents flowing to the shunt resistors of the other phases.

One or more embodiments of the present invention include multiple processes for the failure determination. For example, embodiments of the present invention include the method in which the determination unit sequentially performs determination on presence of the ON failure based on the shift of the detection timing for each phase, and after the determination on the presence of the ON failure is finished for all phases, the determination unit detects a phase current flowing to the shunt resistor of each phase in the OFF period of the switching element on the upper side without shifting the detection timing, and determines presence of other failures based on the detected phase current.

Thus, after shifting the detection timing and performing the determination on the presence of the ON failure for each phase, the determination on failures based on the normal phase current detection in which the detection timing is not shifted is performed, whereby other failures such as ON failure of the switching element on the upper side and failure of the phase current detection circuit can be diagnosed in addition to the ON failure of the switching element on the lower side in each phase. As a result, the failure determination of higher accuracy can be performed.

In addition, as another process, the determination unit performs determination on the presence of the ON failure based on the shift of the detection timing for a certain phase, and before performing similar determination on the next phase, the determination unit detects the phase current flowing to the shunt resistor of each phase in the OFF period of the switching element on the upper side without shifting the detection timing and determines the presence of other failures based on the detected phase current.

Similar to above, since other failures can be diagnosed in addition to the ON failure of the switching element on the lower side in each phase, the failure determination of higher accuracy can be performed. Depending on the responsiveness of the phase current detection circuit, it is sometimes difficult to shift the detection timing with respect to a certain phase and make a determination on the ON failure, and thereafter, immediately return the detection timing on such phase to the original timing, and shift the detection timing with respect to the next phase to proceed to the ON failure determination. However, smooth failure determination can be performed even if problem arises in the responsiveness of the phase current detection current by interposing a step of performing failure determination based on the normal phase current detection before proceeding from the ON failure determination of a certain phase to the ON failure determination of the next phase.

In one or more embodiments of the present invention, the determination unit may repeat the determination on the presence of the ON failure on one phase over a predetermined number of times.

In one or more embodiments of the present invention, a current value calculation unit for calculating the current value based on the current value flowing to the shunt resistor in the OFF period of the switching element on the upper side in the phase may be used in place of the current value estimation unit for estimating the current value of the phase in a case where the detection timing is shifted based on the currents flowing to the shunt resistors of the other phases.

In this case, the sampling is performed in both the ON period and the OFF period of the switching element on the upper side. Thus, the current value of the phase in a case where the detection timing is shifted can be obtained not as the estimated value but as an actual measurement value.

According to one or more embodiments of the present invention, a multiphase motor driving device capable of detecting the ON failure of the switching element on the lower side in the inverter circuit by shifting the detection timing of the current flowing to the shunt resistor is provided.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A multiphase motor driving device comprising:
   an inverter circuit comprising:
     a pair of upper and lower switching elements arranged in correspondence to each of a plurality of phases,
     a shunt resistor for phase current detection connected to each switching element on a lower side of each phase, and
     a voltage for driving a multiphase motor retrieved from a node of the pair of switching elements in each phase; and
   a control unit for controlling ON/OFF operation of each switching element of the inverter circuit,
   wherein the multiphase motor driving device detects a current flowing to the shunt resistor during an OFF period of the switching element on the upper side;
   a determination unit for
     shifting a detection timing of the current flowing to the shunt resistor of a certain phase from the OFF period to the ON period of the switching element on the upper side in the phase and
     determining whether or not ON failure in which the switching element on the lower side in the phase remains in the ON state occurred based on the current flowing to the shunt resistor of the phase in the ON period; and
   a current value estimation unit for estimating a current value of the phase in a case where the detection timing is shifted based on currents flowing to the shunt resistors of other phases.

2. The multiphase motor driving device according to claim 1, wherein
   the determination unit sequentially performs determination on presence of the ON failure based on the shift of the detection timing for each phase, and
   after the determination on the presence of the ON failure is finished for all phases,
     the determination unit detects a phase current flowing to the shunt resistor of each phase in the OFF period of the switching element on the upper side without shifting the detection timing, and
     the determination unit determines presence of other failures based on the detected phase current.

3. The multiphase motor driving device according to claim 2, wherein the determination unit repeats the determination on the presence of the ON failure on one phase over a predetermined number of times.

4. The multiphase motor driving device according to claim 1, wherein
   the determination unit performs determination on the presence of the ON failure based on the shift of the detection timing for a certain phase, and
   before performing similar determination on the next phase, the determination unit detects the phase current flowing to the shunt resistor of each phase in the OFF period of the switching element on the upper side without shifting the detection timing and the determination unit determines the presence of other failures based on the detected phase current.

5. The multiphase motor driving device according to claim 4, wherein the determination unit repeats the determination on the presence of the ON failure on one phase over a predetermined number of times.

6. A multiphase motor driving device comprising:

an inverter circuit comprising:

a pair of upper and lower switching elements arranged in correspondence to each of a plurality of phases, a shunt resistor for phase current detection connected to each switching element on a lower side of each phase, and a voltage for driving a multiphase motor retrieved from a node of the switching elements in each phase; and a control unit for controlling ON/OFF operation of each switching element of the inverter circuit, wherein the multiphase motor driving device detecting a current flowing to the shunt resistor during an OFF period of the switching element on the upper side;

a determination unit for shifting a detection timing of the current flowing to the shunt resistor of a certain phase from the OFF period to the ON period of the switching element on the upper side in the phase and determining whether or not ON failure in which the switching element on the lower side in the phase remains in the ON state occurred based on the current flowing to the shunt resistor of the phase in the ON period; and a current value calculation unit for calculating a current value of the phase in a case where the detection timing is shifted based on currents flowing to the shunt resistors in the OFF period of the switching element on the upper side in the phase.

* * * * *